United States Patent

Ganong, Jr. et al.

[15] 3,648,027
[45] Mar. 7, 1972

[54] DATA MONITORING SYSTEM

[72] Inventors: William L. Ganong, Jr.; Furnie S. Bryant; Henry R. Neill, all of Clarksville; Robert G. Davies, Boydton, all of Va.

[73] Assignee: Burlington Industries, Inc., Greensboro, N.C.

[22] Filed: Nov. 18, 1969

[21] Appl. No.: 877,675

[52] U.S. Cl. ............235/92 QC, 235/92 R, 235/92 PD, 235/92 ST, 235/92 PE, 235/92 T, 242/36
[51] Int. Cl. ...........................................G06m 3/02
[58] Field of Search ..................235/92 FQ, 92 PD, 92 QC; 242/35.5, 35.6, 36, 37; 226/11

[56] References Cited

UNITED STATES PATENTS

| | | | |
|---|---|---|---|
| 3,511,448 | 5/1970 | Brouwer | 242/35.6 R |
| 3,173,622 | 3/1965 | Dilling | 242/35.6 R |
| 3,263,064 | 7/1966 | Lindars | 235/92 FQ |
| 3,438,188 | 4/1969 | Boggs | 242/37 R |
| 3,391,840 | 7/1968 | King | 226/11 |
| 3,458,912 | 8/1969 | Werffeli | 242/38.6 |
| 3,003,691 | 10/1961 | Strandberg | 235/92 ST |

*Primary Examiner*—Thomas A. Robinson
*Assistant Examiner*—Robert F. Gnuse
*Attorney*—Cushman, Darby & Cushman

[57] ABSTRACT

A data monitoring system for use with yarn winders and the like including a yarn-break sensor network which senses the existence of a yarn break for each bobbin-cone or spindle combination of the winder. An indicator network or red-light network is provided for determining when a red light occurs as a result of the failure of the winder to successfully tie together broken strands of yarn. A full-cone sensor and accumulator network is provided in circuit with the yarn-break sensor network and the indicator network and an efficiency determining network is connected in circuit with the yarn-break sensor network, the indicator network and the full-cone sensor and accumulator network for determining and indicating the efficiency of operation of the winder. A slub count accumulator system is also provided.

9 Claims, 6 Drawing Figures

Patented March 7, 1972

INVENTORS
FURNIE S. BRYANT, HENRY R. NEILL,
ROBERT G. DAVIES & WILLIAM L. GANONG

BY Cushman, Darby & Cushman
ATTORNEYS

Patented March 7, 1972

INVENTORS
FURNIE S. BRYANT, HENRY R. NEILL,
ROBERT G. DAVIES & WILLIAM L. GANONG

BY Cushman, Darby & Cushman
ATTORNEYS

INVENTORS
FURNIE S. BRYANT, HENRY R. NEILL,
ROBERT G. DAVIES & WILLIAM L. GANONG
BY Cushman, Darby & Cushman
ATTORNEYS INVENTORS
FURNIE S. BRYANT, HENRY R. NEILL,
ROBERT G. DAVIES & WILLIAM L. GANONG
BY Cushman, Darby & Cushman
ATTORNEYS

DATA MONITORING SYSTEM

The present invention relates to monitoring systems and more particularly to monitoring systems for use with yarn winders whereby information with respect to machine performance can be gathered and provided for the use of supervisory personnel for the optimization of machine manpower utilization. The present invention monitors and totalizes the performance of each bobbin-cone or spindle unit in an effort to pin-point mechanical malfunctions, operator ineffectiveness and defective yarn running conditions and provides the maintenance and supervisory staff with valuable process information.

With the introduction of high-speed automated textile machinery, management and supervisory personnel require accurate and reliable machine-monitoring systems for the optimization of machine and manpower utilization. The present invention fulfills the need for such monitoring systems and provides management and supervisory personnel with total performance information for each 10-bobbin cone or spindle unit in a yarn winder.

Thus, the general purpose of this invention is to provide a series of monitoring systems which gather information for management and supervisory personnel and which provide a powerful tool for effective control over manpower and machinery.

An object of the present invention is the provision of a monitoring system which totalizes the performance of each spindle unit in a winder to enable management to pinpoint mechanical malfunctions, operator ineffectiveness and defective-yarn running conditions.

Other objects and features of the invention will become apparent to those of ordinary skill in the art as the disclosure is made in the following description of a preferred embodiment of the invention as illustrated in the accompanying sheets of drawings in which.

Because the winding process is one of the final stages during yarn manufacture, it serves as a convenient inspection point for determining the quality of yarn produced. The winding process involves the transfer of yarn wound on spinning bobbins to cones and each cone consists of a continuous length of yarn which has been transferred from a number of spinning bobbins. As a result, a series of splices are required between the tailing end of the yarn on one bobbin and the leading end of the yarn on another bobbin.

Figure 1:
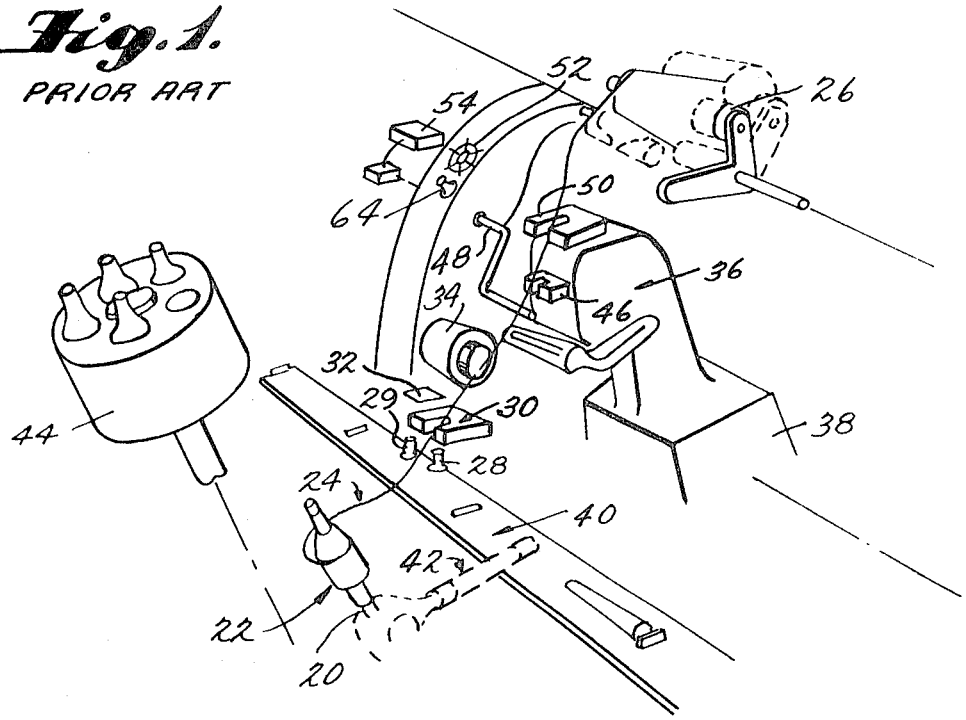
FIG. 1 is a partial perspective view of a known basic winder spindle.

A basic winding frame or winder spindle exemplary of those known in the art is shown in FIG. 1 and includes a stationary shaft 20 which maintains a bobbin 22 in an upright position to facilitate the transfer of yarn 24 onto the positively driven cone spindle 26. Other elements are used in the winder spindle and these include the tension discs 28 and 29, the slub detector 30, the slub knife 32 and tension motor 34 which together with tension discs 28 and 29 maintain sufficient drag on the yarn 24 to prevent backlash and tangles. The tension discs and the tension motor also act to purposely break weak sections of the yarn. The slub detector 30 inspects the yarn for thickness or density variations and actuates the knife 32 when defective yarn is sensed. Slub-detector sensing elements employ either electrostatic (capacitive), optical (photocell) or mechanical (gauge) means for its operation.

A typical winding frame may consist of 60 spindles aligned in a row and adjacent to one another. The winder tender or attendant patrols the length of the winding frame replenishing spent bobbins and splicing the tailing end of one bobbin to the leading end of another and performing other servicing duties as required.

The Schalfhorst autoconer winder (as an example of those known in the art) is of European design and was introduced into the American textile industry in an effort to automate the winding process. Each of these winders is equipped with 50 automatic spindles composed of five groups of 10 spindle sections. An automatic knot-tying mechanism 36 traverses the length of each 10 spindle section and performs operations previously done manually. This mechanism is known as the knotter. The knotter is fully automatic and moves on a carriage 38. The knotter pauses at each of the unproductive spindles to perform the required corrective action. A built-in trip mechanism ejects the spent bobbin 22 and replenishes the spindle with a full bobbin. The knot-tying mechanism automatically splices the leading end of the full bobbin to the tail end of the spent bobbin and provides a continuous yarn to the cone 26. The ejected bobbin then falls onto a belt conveyor 40 to be collected at a central collection point.

The knotter 36 in FIG. 1 is shown in the servicing position and provides the motivating force to eject the spent bobbin 42 onto an empty-bobbin conveyor 40. A full bobbin 22 is then fed from the bobbin magazine 44 into position on the stationary shaft 20. The knotter head assembly 46 splices both ends of the yarn 24 together and after completing a splice, the spindle restarts and continues to run until the yarn feeler 48 detects a broken yarn. The spindle also becomes unproductive when the cone 26 has been wound to full capacity and the full-cone position is shown dotted in FIG. 1.

A yarn-irregularity detector called the knot tester 50 is mounted on the knotter assembly 46 to detect and sever any "long-tailed" or untrimmed knots. In addition, an operator warning or indicator light 52 commonly called the "red light" is illuminated when the yarn feeler 48 is consecutively activated following a series of unsuccessful tying attempts by the knotter. The electronic failure control unit 54 is electrically coupled to the yarn feeler 48 and is programmed to disengage the spindle unit following a predetermined series of unsuccessful tying attempts by the knotter. Once this "red-light" condition occurs, the knotter makes no attempt to service the spindle and bypasses it on successive passes. Until the winder attendant performs the corrective action the spindle remains disengaged and unproductive.

The winder attendant performs a number of tasks essential to the operation of the winder. He replenishes each bobbin magazine 44, corrects tangled-yarn conditions, removes slaughs off bobbins, doffs full cones, and performs other corrective tasks to ensure uninterrupted running conditions. Productivity and maximum utilization of the automatic winder depend to a great extent upon the effectiveness of the operator in performing his assigned tasks.

Figure 2:
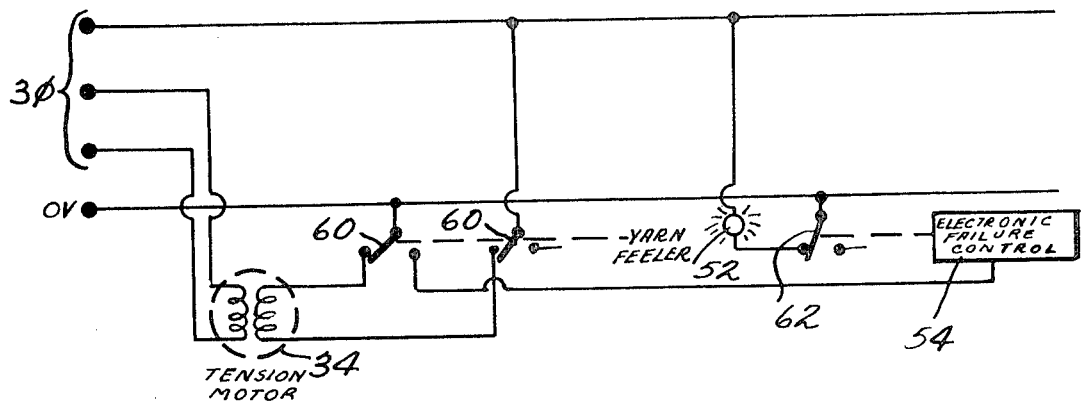
FIG. 2 is a schematic illustration of a known spindle electrical circuit.

FIG. 2 shows a simplified schematic diagram of a known spindle electrical circuit. The switch 60 is mechanically coupled to the yarn feeler 48 and controls the activities of the tension motor 34 as well as the electronic failure control unit 54. During the normal course of operation, the switch 60 applies power to the tension motor 34 and remains in this position until a yarn break occurs. When a yarn break does occur, switch 60 transfers and disconnects the tension motor 34. The switch 60 remains in this position until the yarn feeler 48 returns to its normal operating condition. The switch 60 also serves as a means for providing energy to the electronic failure control 54. This control is programmed in a known manner to mechanically disengage the spindle unit following a series of unsuccessful retying attempts and activates a solenoid plunger, which in turn, transfers switch 62. The switch 62 energizes the red light 52 and remains in this position until the operator corrects the fault and resets the red-light reset button 64 (FIG. 1).

Figure 3:
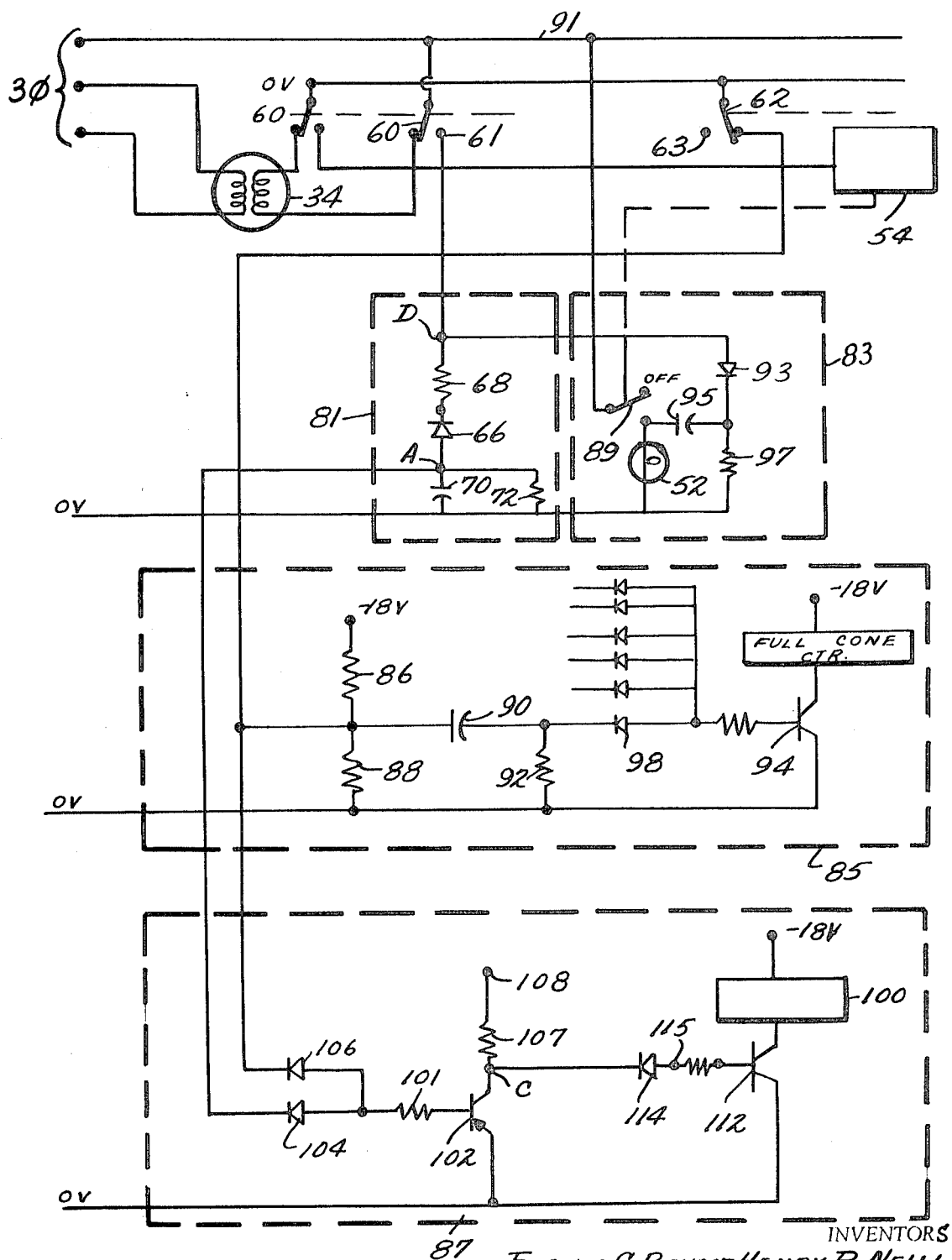
FIG. 3 is a schematic diagram of an embodiment of this invention together with a modified version of the circuit of FIG. 2.

FIG. 3 shows the efficiency monitoring system of this invention which includes a yarn-break sensor network 81, an indicator network 83, a full-cone sensor and accumulator network 85 and an efficiency determining network 87.

Thus, the efficiency of operation of each winder may be determined by the number of yarn breaks, the number of red lights and the number of full cones which occur so that the winder is placed into an inoperative condition.

The yarn-break sensor network derives its input from the yarn feeler switch 60 and when a yarn break occurs, the switch 60 transfers the AC source from the tension motor 34 to the resistor 68 and diode 66. The diode rectifies the incoming AC signal and provides a rectified signal to the network including capacitor 70 and resistor 72.

The indicator or red light network 83 does not include a counter for registering the occurrence of red lights but the red light information is used as an input to the efficiency determining network 87. A second switch 89 in addition to the first switch 60 is coupled to an input line 91, for example. A diode 93 is coupled to the yarn-break sensor network at point D and a capacitor 95 is coupled between the red light 52 and the diode 93. In addition, a resistor 97 is placed in circuit across the capacitor 95 and a red light or indicator 52.

Following a series of unsuccessful knot-tying attempts, the electronic failure control 54 activates a solenoid (not shown) and transfers switch 89 to the "on" red light position. The AC voltage from input 91 is also fed through capacitor 95 and is rectified by diode 93. The signal is then fed through diode 66 and the capacitor 70 smoothes the half-wave voltage. From here the signal is fed to diode 104 and resistor 101 to the base of transistor 102 in the efficiency determining network 87. The values of the resistor 97, capacitor 95 and diode 93 in the indicator network 83 are chosen so that when the first switch 60 is in contact with terminal 61 the red light 52 does not light. The AC voltage from the terminal 61 is rectified by diode 93 so that a positive pulsating DC voltage is applied to the junction of capacitor 95 and resistor 97. The capacitor 95 is chosen to be of a sufficiently high impedance to this DC voltage so that most of it is dropped across resistor 97 and the red light 52 does not light merely upon closure of the first switch 60.

The full-cone sensor and accumulator network 85 also provides an input to the efficiency determining network 87. When there is no full cone, the switch 62 is closed, as illustrated in FIG. 3, holding the cathode of diode 106 at zero potential. When a full cone occurs, the switch 62 moves to terminal 63 and the cathode of diode 106 goes negative. This negative voltage is fed through diode 106 and resistor 101 to the base of the condition detector or logic transistor 102 so that the transistor is turned on. With transistor 102 turned on base current flows and saturates the transistor which causes collector point C to drop to zero potential. Sampling of the efficiency determining network 87 is accomplished by sequentially applying a −18 volt pulse, for example, to each of the sampling points, e.g., terminal 108. An operating spindle when sampled produces an output at point C by nature of the nonconducting transistor 102 while a nonoperating spindle does not produce an output at point C when sampled.

Similarly, the existence of a yarn-break and a negative voltage at point A or the presence of a red-light condition with a negative voltage at point A causes the base current to flow in transistor 102. In each instance the spindle is inoperative and the spindle efficiency is decreased. Thus, whenever the spindle is operating an output is produced at point C by nature of the nonconducting transistor 102 while a nonoperating spindle which results from a yarn-break, a red light condition or a full-cone condition does not produce an output at point C when the terminal 108 is sampled by the scanner system described in FIGS. 5 and 6. As a result, when the terminal 108 is scanned and the spindle associated with efficiency determining network 87 is operating the counter driver transistor 112 is placed into a conducting condition so that a count is registered on efficiency counter 100. However, if the spindle associated with efficiency determining network 87 is not operating when the terminal 108 is scanned no current will drive the transistor 112 into conduction and no count will be registered on the efficiency counter 100.

Figure 5:
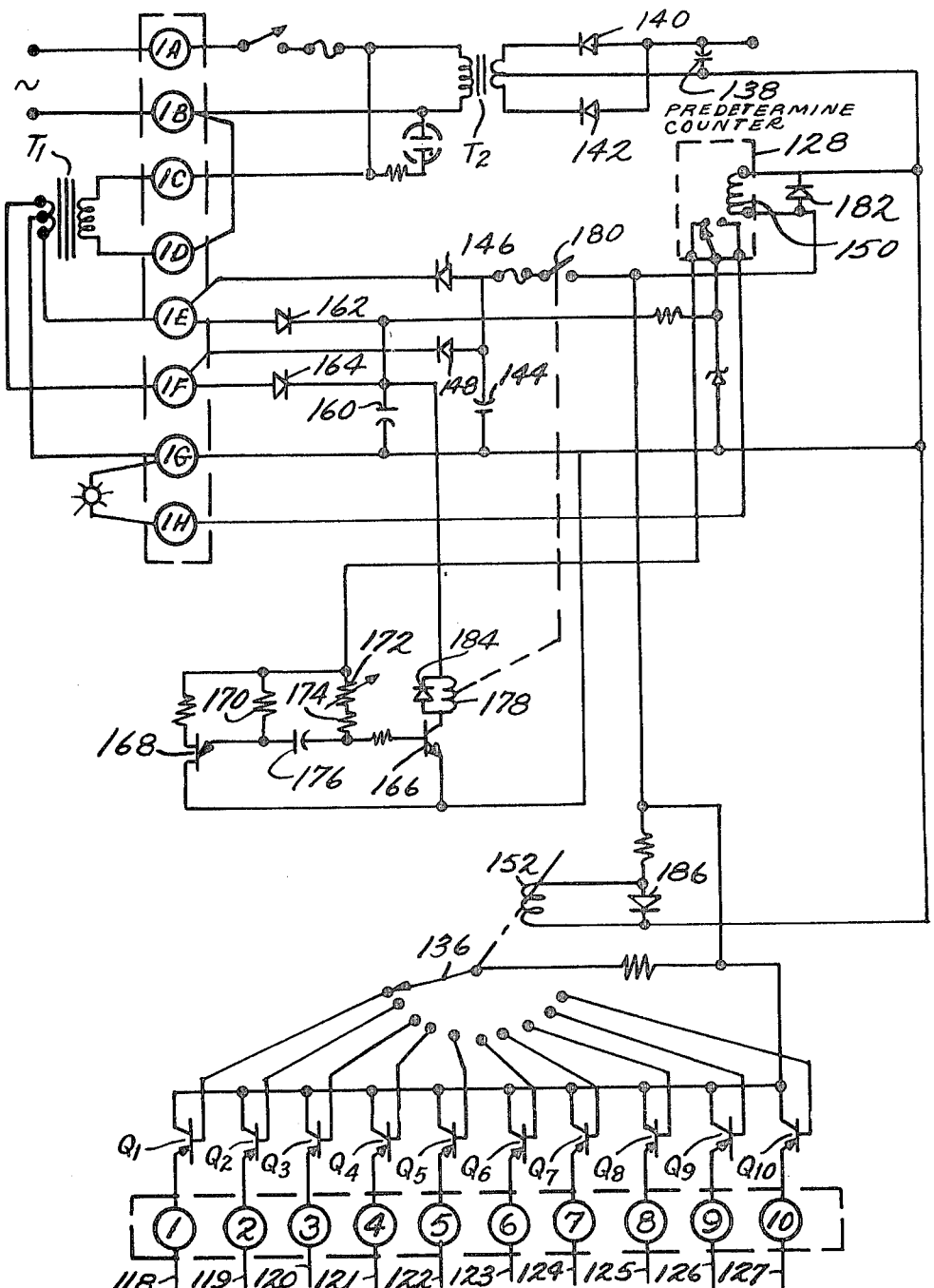
FIG. 5 is a schematic diagram of the power supply and scanning arrangement used with the invention.
Figure 6:
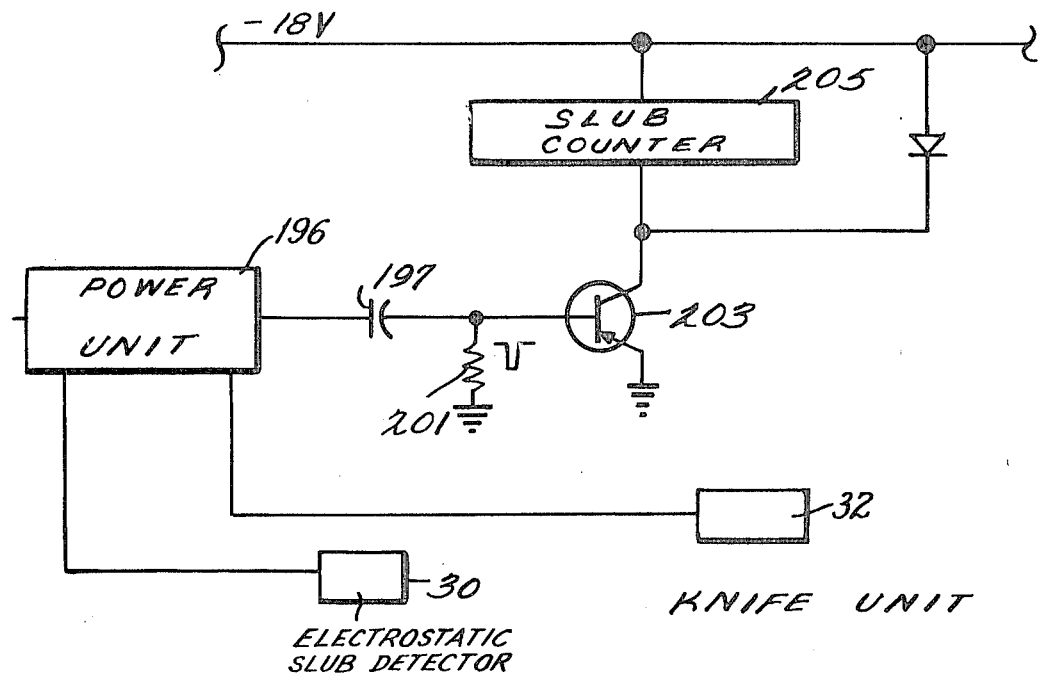
FIG. 6 is a block diagram view, partly in schematic, of the slub accumulator system of this invention.

The efficiency determining network 87 can determine the running efficiency of a 10-spindle section. A master 10 position stepping switch, as illustrated in FIGS. 5 and 6, polls each spindle sequentially for active spindles and each spindle when polled responds with either an output signal for an operating spindle or the absence of a signal for an idle spindle. This sequential sample continues until the programmed number of samples have been taken, the sampling being done in sets of 100, 1,000 or 10,000 for example. At the end of this sampling period the counter 100 displays the total active spindles which represents the percent running efficiency during the recorded period. As an example, a total of 856 counts recorded at the end of 1,000 samples represents a running efficiency of 85.6 percent.

Figure 4:
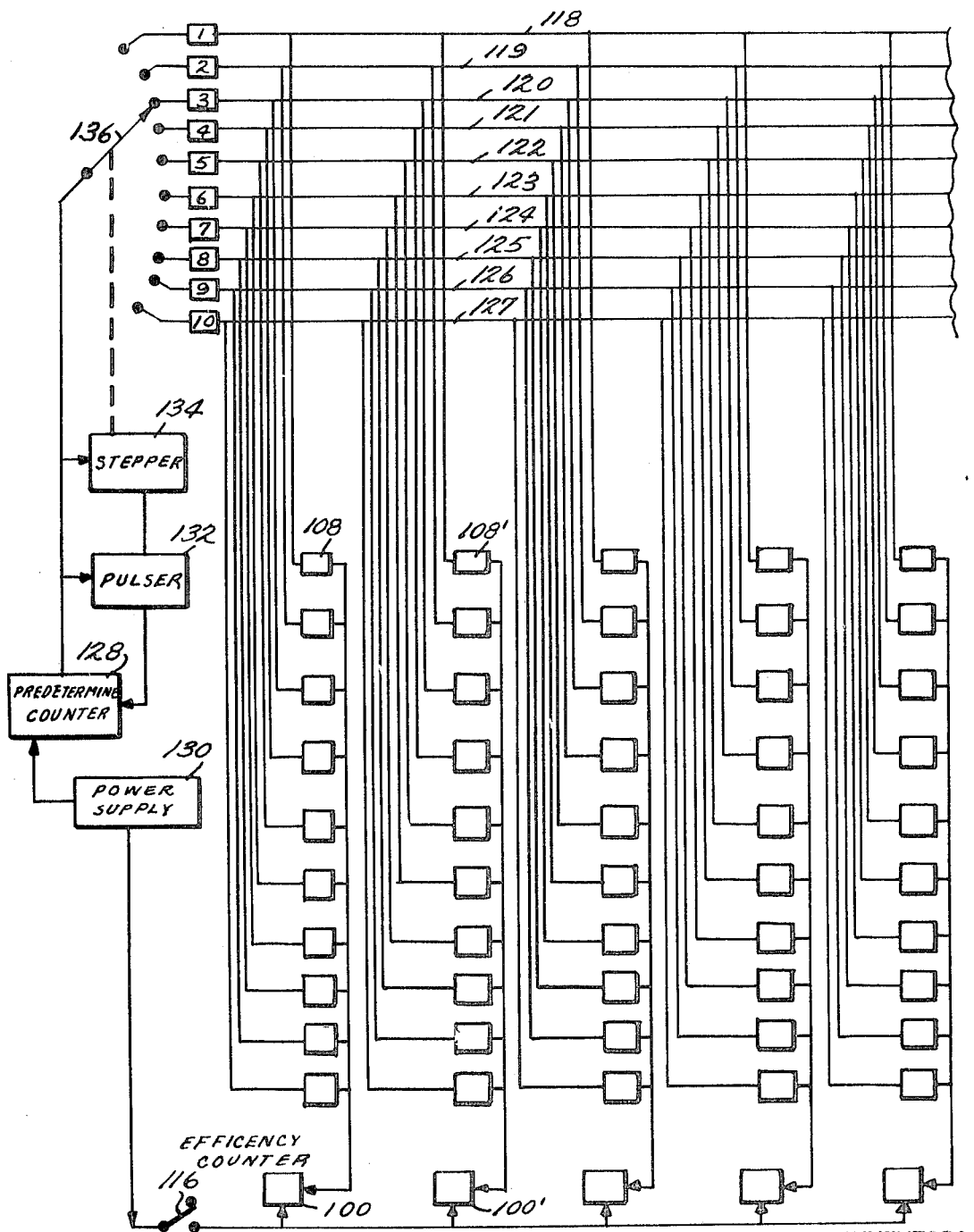
FIG. 4 is a simplified block diagram of the efficiency monitoring system and scanning arrangement used with this invention.

FIG. 4 illustrates a simplified block diagram of the centralized scanning system which is utilized in conjunction with the efficiency monitoring system to enable each respective efficiency counter 100 to measure the efficiency of a group of ten spindles. A master 10 position scanning array provides the sampling pulses for the entire system of five sections having 10 spindles in each section. All sampling points on spindles No. 1, e.g., terminals 108, 108' etc., are commonly driven by scanner bus 118, and in a similar manner, all other sampling points are driven by a respective scanner bus 119-127. The master scanner continually samples each of the 10-spindle positions and repeats its sequence until the programmed number of samplings have been taken. The predetermining counter 128 stops the sampling sequence following a total of 100, 1,000 or 10,000 samplings, for example, and the totalized counts displayed on the efficiency counter 100, 100', etc., at the end of this count period represent the running efficiency for each section. At the end of this display period the predetermined and efficiency counters may be manually reset to begin another cycle.

The power supply 130 is coupled to the predetermined counter, which in turn, is coupled to pulser 132 and to stepper 134. The pulses produced by the pulser 132 are fed to the predetermined counter 128 and to the stepper 134 so that the movable contact 136 is sequentially stepped with respect to the busses 118-127.

FIG. 5 is a schematic diagram of the central power supply and master scanner. This unit provides the scanning pulses and power to the entire monitoring system. Transformer $T_2$ supplies power to the output filter capacitor 138 through full wave rectifiers 140 and 142. The resulting output voltage supplies the counters of the various accumulator systems and the −18 volt terminals in each of the spindle units. Transformer $T_1$ supplies power to filter capacitor 144 through full-wave rectifiers 146 and 148 and this rectified output supplies power to the predetermining counter coil 150, stepper relay coil 152 and the sampling busses as they are sequentially energized. Transformer $T_1$ also supplies filter capacitor 160 through full-wave rectifiers 162 and 164 with the output across capacitor 160 being a positive 18 volts, for example, which provides power to the timing oscillator and to the scanner output transistor 166.

The timing oscillator circuit illustrated in FIG. 5 includes a unijunction transistor 168 coupled to the timing R-C network which includes resistors 170, 172 and 174 as well as capacitor 176. Variable resistor 172 controls the rate of timing and the output of the oscillator drives output transistor 166. The relay coil 178 is the output load of transistor 166 and provides driving impulses simultaneously to the predetermined count coil 150 and to the stepping relay coil 152. The duration of the closure of relay contacts 180 determines the length of the sampling pulses and the scanner gating transistors $Q_1 - Q_{10}$ provide the output to the scanner busses 118-127, respectively. The gating transistors extend the life of the stepping-switch contacts by allowing the base current of low magnitude to flow through the respective-switch contacts while the greater sampling current flows through the transistor emitter-collector paths. Diodes 182, 184 and 186 serve as protective devices to suppress inductive "kicks" that may develop across their respective cells.

FIG. 6 illustrates the slub accumulator system of this invention. Each bobbin-cone combination or spindle unit includes a known electrostatic detector 30 and associated knife unit 32 (FIG. 1) which detects the presence of slubs or thin spots in the yarn 24 as the yarn passes through the detector. The detector is coupled to a power unit 196 which is known and both are available from the Uster Corporation of Charlotte, N.C. When any of the knife solenoids associated with the detectors 30 are activated a voltage level shift appears at the output 197 (pin No. 4 of the Uster power unit). This output is connected to an RC differentiating network which includes capacitor 199 and resistor 201. This network forms a negative-going pulse which is fed to the base of the counter drive transistor 203 and when this is turned on by a slub pulse, one count is registered in the slub counter 205. The values of capacitor 199 and resistor 201 are chosen to give a time constant of 100 microseconds or less so that all random slub counts are registered. If a larger time constant is used it is possible that two almost simultaneous slub counts (from separate spindles) might not be detected due to the slow response of the differentiating network.

This invention, thus, provides a powerful tool for effective control over manpower and machinery. Information gathered by means of this invention enables management to analyze trends, highlight problem areas, implement corrective measures and to follow up the results of corrective action. The various portions of this invention can be readily interfaced with computers to provide important information desired by management with respect to the operation of machinery and the effectiveness of manpower.

Obviously many modifications and variations of the present invention are possible in light of the above teachings. It is therefore to be understood that within the scope of the appended claims the invention may be practiced otherwise than as specifically described.

We claim:

1. For use in combination with a yarn winder having electrical inputs, an electrical tension motor for maintaining yarn tension, a first electrical switch controlling said motor, an indicator connected to at least one of said electrical inputs and a second electrical switch controlling said indicator, an efficiency monitoring system comprising:
    a yarn-break sensor network connected to and controlled by said first switch;
    a failure indicator network connected to and controlled by both said first switch and said second switch;
    a full-cone sensor and accumulator network; and
    an electronic efficiency determining network connected to said yarn-break sensor network, said failure indicator network and said full-cone network for determining and indicating the efficiency of operation of said winder by counting and accumulating the percentage of successful station operating time during a predetermined time period during which each station's condition is successively and repetitively sampled a predetermined number of times.

2. An efficiency monitoring system as in claim 1 wherein said failure indicator network includes:
    a rectifier connected to said first switch;
    a capacitor connected between said rectifier and a failure indicator; and
    a resistor connected across said capacitor and said failure indicator.

3. An efficiency monitoring system as in claim 2 wherein said rectifier, said capacitor and said resistor are of predetermined values to prevent activation of said failure indicator when said first switch connects one of said inputs to said failure indicator network and when said second switch does not simultaneously connect one of said inputs to said failure indicator network whereby the failure indicating network is not activated to indicate nonoperation of the associated station unless both said first and said second switch are activated.

4. A process monitoring system for monitoring the operations of a yarn-winding machine comprising a plurality of bobbin-cone stations for winding yarn from a bobbin onto a cone, said machine also including an automatic knot tier for connecting loose ends of yarn, and, at each station thereof, a yarn-break detector, a bad knot detector and a failure detector connected to the bad knot detector for sensing a predetermined number of successive bad knots, said monitoring system comprising:
    a full-cone sensor at each of said stations for sensing when said cone is filled with yarn,
    a condition detector means at each of said stations connected to said yarn-break detector, to said full-cone sensor and to said failure detector for sensing the operating condition of its associated station by providing a first output condition to indicate a nonoperating condition when either said yarn-break detector, said full-cone detector or said failure detector has been activated and a second output condition to indicate an operating condition when neither said yarn-break detector, said full-cone detector nor said failure detector have been activated,
    scanning means operatively connected to a plurality of said stations, for successively and repetitively interrogating a respectively corresponding plurality of said condition detector means and for recording and accumulating at least one of the instantaneous conditions thereof to provide an efficiency indication after a predetermined number of scanning cycles, "by counting and accumulating the percentage of successful station operating time during a predetermined time period during which each station's condition is successively and repetitively sampled a predetermined number of times," and
    a full-cone accumulator operatively connected to said full-cone sensors at a plurality of stations for counting and indicating the total number of sensed full cones.

5. A process monitoring system as in claim 4 further comprising:
    a failure accumulator operatively connected to said yarn-break detectors at a plurality of stations for counting and indicating the total number of detected failures.

6. A process monitoring system as in claim 4 further comprising a yarn-break accumulator operatively connected to said yarn-break detectors at a plurality of stations for counting and indicating the total number of detected yarn breaks.

7. A process monitoring system as in claim 4 for use with a yarn winding machine also having a slub detector at each station, said system further comprising:
    a slub accumulator operatively connected to a plurality of said slub detectors for counting and indicating the total number of detected slubs.

8. A process monitoring system as in claim 4 wherein said stationary electronic scanning means includes:
    predetermined counter means for automatically stopping the interrogation after said predetermined number of scanning cycles, and
    efficiency counter means for recording the number of occurrences of said at least one condition detected during said predetermined number of scanning cycles whereby a direct efficiency reading is provided.

9. In combination,
    a yarn winding machine comprising:
    1. a plurality of bobbin-cone stations for winding yarn from a bobbin onto a cone,
    2. an automatic knot tier for connecting loose ends of yarn,
    3. a yarn-break detector at each station for detecting a broken yarn condition thereat,
    4. a bad knot detector at each station for detecting unacceptable knots produced by said automatic knot tier thereat, 5. a failure detector at each station connected to its associated bad knot detector for sensing a predetermined number of successive bad knots during operation of said automatic knot tier thereat which number is interpreted as a failure to cause subsequent bypassing of that station by the automatic knot tier until the reason for the failure has been corrected and the failure detector reset,
6. a full-cone sensor at each of said stations for sensing when the respectively associated cone is filled with yarn,
7. a condition detector means at each of said stations, which condition detector is connected to its respectively associated yarn-break detector, full-cone sensor and failure detector for sensing the operating condition at each station by providing a first output condition to indicate station nonoperation when any one of said yarn break detector, said full-cone detector or said failure detector is then activated and a second output condition to indicate station operation when none of said yarn-break detector, said full-cone detector or said failure detector have been activated,
8. stationary electronic scanning means connected to a plurality of said stations for successively and repetitively interrogating the condition detector means respectively corresponding thereto for recording and accumulating the number of occurrences of at least one of the first and second output conditions instantaneously existing at each scanned station during any interrogation period, said stationary electronic scanning means including predetermined counter means for automatically stopping the interrogation of said plurality of stations after a predetermined number of station interrogations have occurred whereby a direct indication of efficiency is provided, and
9. a full-cone accumulator connected to said full-cone sensors at a plurality of stations for counting and indicating the combined total number of sensed full-cones at all of said plurality of stations.

* * * * *